United States Patent
Hohne

[11] 3,985,865
[45] Oct. 12, 1976

[54] METHOD FOR THE GENERATION OF HYDROGEN

[75] Inventor: Karl Hohne, Erlangen, Germany

[73] Assignee: Siemens Aktiengesellschaft, Munich, Germany

[22] Filed: Apr. 28, 1975

[21] Appl. No.: 572,514

[30] Foreign Application Priority Data
May 3, 1974   Germany............ 2421538

[52] U.S. Cl............... 423/657; 423/648
[51] Int. Cl.² ............ C01B 1/07; C01B 1/02
[58] Field of Search............ 423/657, 648

[56] References Cited
UNITED STATES PATENTS

| | | |
|---|---|---|
| 1,059,818 | 4/1913 | Bergius............ 423/648 |
| 2,623,812 | 12/1952 | Eborall et al............ 423/657 R |
| 3,017,250 | 1/1962 | Watkins............ 423/657 |
| 3,540,854 | 11/1970 | Brooke, Jr. et al............ 423/657 X |
| 3,703,358 | 11/1972 | Carson, Jr. et al............ 423/657 |

*Primary Examiner*—Edward Stern
*Attorney, Agent, or Firm*—Kenyon & Kenyon Reilly Carr & Chapin

[57] ABSTRACT

The invention provides a method for the generation of hydrogen, particularly for the generation of hydrogen for fuel cells. The hydrogen is generated through reaction of magnesium or a magnesium-aluminum mixture with water in the presence of at least one cobalt oxide and at least one water-soluble chloride, there being additionally admixed to the reaction mixture a molybdenum compound, particularly a molybdenum oxide or a molybdenate.

3 Claims, 1 Drawing Figure

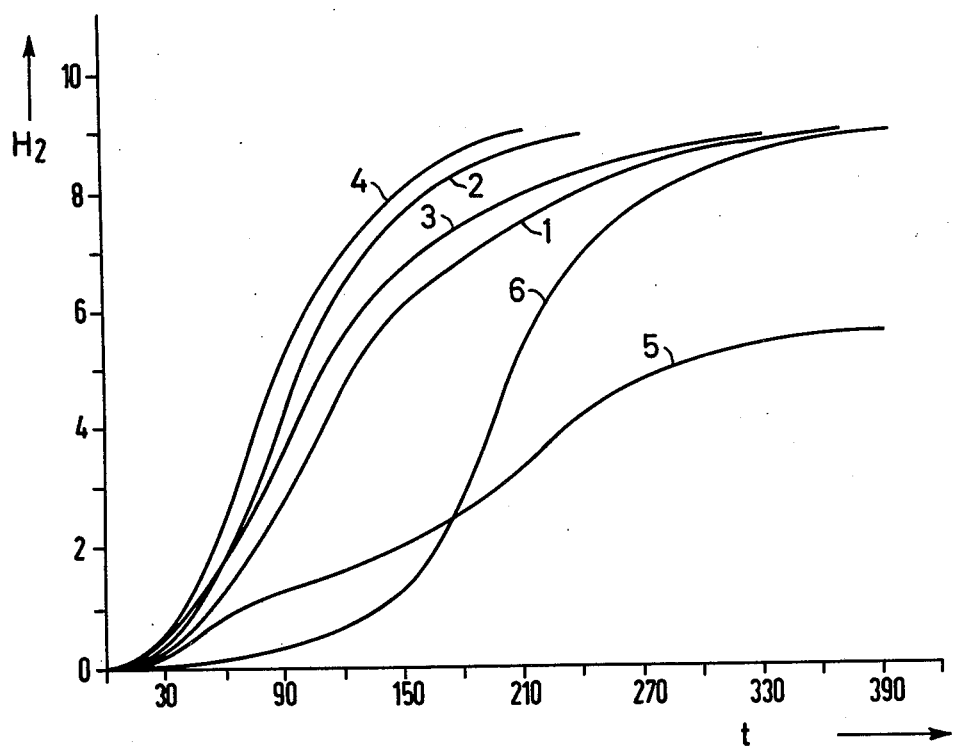

METHOD FOR THE GENERATION OF HYDROGEN

BACKGROUND OF THE INVENTION

This invention is concerned with a method for generating hydrogen, particularly for generating hydrogen for fuel cells.

In U.S. Pat. Application Ser. No. 397,009, filed Sept. 13, 1973, now U.S. Pat. No. 3,932,600, issued Jan. 13, 1976, and German Offenlegungsschrift 2,244,944 (page 11, claims 1 to 3), a method for the generation of hydrogen, particularly hydrogen for fuel cells, is described by the reaction of metals with water. According to the disclosures the process comprises reacting with water particles of magnesium metal or a combination of magnesium and aluminum metal, such particles being admixed with an oxide of cobalt and the reaction which generates the hydrogen occurring in the presence of a watersoluble chloride. The disclosed method permits generation of hydrogen in a simple manner, and it requires neither the use of acids or alkaline solutions for the decomposition of the metals, nor the use of substances such as mercury for activating the metals through amalgamation. Magnesium and aluminum are advantageously used in a weight ratio of about between 7:1 and 2:6, and preferably between about 5:3 and 3:5. The cobalt oxide is added to the metal or the metal mixture in an amount which is preferably between 0.5 and 5% by weight, based on the metal. The amount of chloride used is preferably in the range between 5% and 200% by weight, based on the metal content. Fillers can be added to the metal which prevent agglomeration of the metal particles and ensure hydrolysis of the metal to a large extent. Any or a mixture of cobaltous oxide (CoO), cobaltic oxide ($Co_2O_3$) and tricobalt tetraoxide ($Co_3O_4$) may be employed. Particularly good results are obtained with $Co_2O_3$ and $Co_3O_4$, especially with $Co_3O_4$.

The water-soluble chloride is preferably sodium chloride. Other suitable chlorides are, for instance, potassium chloride and magnesium chloride.

The chloride can be added to the metal or the metal mixture but it can also be dissolved in the water. Sea water is advantageously used as the aqueous chloride solution. Sea water generally contains a total of about 3.5% salts, predominantly in the form of chlorides; the major quantity being sodium chloride which constitutes about 2.7% by weight.

SUMMARY OF THE INVENTION

The present invention is based on the discovery that the above described method for the generation of hydrogen through reaction of magnesium or a magnesium-aluminum mixture with water in the presence of at least one cobalt oxide and at least one water-soluble chloride can be improved further by additionally admixing a molybdenum compound to the reaction mixture.

Through the addition of the molybdenum compound according to the present invention, the yield of hydrogen developed can be increased even further. This is true particularly if the reaction temperature is to be kept low, for example, in order to avoid corrosion problems. Even at temperatures slightly above room temperature the hydrogen yield using the present method is nearly 100%.

Of the molybdenum compounds to be used molybdenum oxides and molybdenate salts are particularly applicable. Molybdenum (VI) oxide $MoO_3$ is preferably used in the method as the molybdenum oxide. Among the molybdenates which can be employed include for example sodium molybdenate $Na_2MoO_4$ and ammonium molybdenate $(NH_4)_2MoO_4$. The molybdenum compound can be added to the metal, i.e., to the magnesium or the magnesium-aluminum mixture, or to the water. The molybdenum compound is preferably used in an amount which is between about 0.5 and 5% by weight, based on the magnesium or the magnesium-aluminum mixture.

BRIEF DESCRIPTION OF THE DRAWING

In the FIGURE, the dependence of hydrogen development on the amount of molybdenum oxide is shown. On the ordinate, the amount of hydrogen is plotted in liters, and on the abscissa, the time $t$ in seconds is plotted. Curves 1 and 2 show the results of experiments where the molybdenum oxide had been added to the powder mixture. Curves 3 and 4 were obtained in tests where the molybdenum oxide was added to the sodium chloride solution. Curve 5 serves as a comparison in which no molybdenum compound was added, and Curve 6 serves as a comparison in which no cobalt oxide was used.

DETAILED DESCRIPTION OF THE PREFERRED EMBODIMENTS

The invention will be explained in further detail with the aid of several examples and the drawing, in which the dependence of hydrogen development on the starting materials used is shown graphically.

In the following, the generation of hydrogen through reaction of a magnesium-aluminum mixture with water in the presence of $Co_3O_4$, sodium chloride and varying amounts of $MoO_3$ is described. For this purpose, 3 g of magnesium powder and 5 g of aluminum powder were thoroughly mixed with 0.3 g $Co_3O_4$ ($Co_3O_4$ content: 3.75% by weight, based on Mg/Al). The $MoO_3$ may be added either to this powder mixture or to the aqueous sodium chloride solution used. The metal powder mixture was placed in a bulb which had a volume of one liter and was equipped with a drip funnel. The bulb was provided with a lateral gas take-off nozzle, which was connected with a gas meter via a cooler. The drip funnel was filled with 100 ml of an aqueous 4-% sodium chloride solution (NaCl content; 50% by weight, base on Mg/Al), which may contain the $MoO_3$. The sodium chloride solution was allowed to flow onto the powder mixture as fast as possible, whereby the hydrogen developed in a violent reaction. The developed hydrogen was measured by the gas meter as a function of time.

In the case of the Curves 1 and 3, the molybdenum oxide content was always 0.1 g, i.e., 1.25% by weight, based on the metal powder. In the case of Curves 2 and 4, the molybdenum oxide content was 0.25 g or 3.1% by weight, referred to the metal powder. While without addition of molybdenum oxide (Curve 5) the development of hydrogen starts relatively slowly and the hydrogen yield is only about 68%. Curves 1 to 4 show that according to the method as per the invention, a very rapid hydrogen development sets in and the hydrogen yield is nearly 100% (the theoretical amount of hydrogen from a mixture of 3 g of magnesium and 5 g of aluminum is about 9 liters). As shown in Curve 6, the hydrogen yield is very high also without the addition of cobalt oxide ($MoO_3$ content: 3.1% by weight, referred to the Mg/Al mixture), but the starting speed of the hydrogen development is considerably lower than the mixtures to which cobalt oxide is added. Therefore, cobalt oxide seems to particularly catalyze the beginning of hydrogen development, while molybdenum oxide influences the entire course of the reaction.

The different results in comparison with the method of U.S. Application 397,009, which were obtained in the investigations without molybdenum addition (Curve 5) can be explained by different reaction conditions. By means of the apparatus described in connection with that method, the metal powder mixture was placed on the surface of the reaction solution gradually. Hence, the powder remained on the water surface for some time while much hydrogen and much heat was being developed. A few centimeters below the surface of the liquid, however, the reaction solution had approximately attained ambient temperature. Thus, only local, but very considerable heating of the reaction solution took place. In the test described above, however, care was taken that the reaction mixture was not over heated. This was achieved by laying out the powder mixture and adding to it the entire reaction solution as fast as possible, so that the heat formed during the development of the hydrogen distributed itself over the entire reaction solution and heated the latter uniformly. The reaction temperature is naturally much lower here than with the procedure described above, and the yield of hydrogen is accordingly smaller by comparison. However, just under these reaction conditions the positive influence of the added molybdenum compound on the hydrogen yield is noted as an advance.

What is claimed is:
1. In a method for generating gaseous hydrogen comprising reacting with water particles of magnesium or a combination of magnesium and aluminum, in a weight ratio of magnesium to aluminum of between about 7:1 to 2:6, said particles being admixed with an oxide of cobalt selected from the group consisting of tricobalt tetraoxide ($CO_3O_4$) and dicobalt trioxide ($CO_2O_3$), said reaction occuring in the presence of a water soluble chloride selected from the group consisting of alkali metal chlorides and magnesium chloride, wherein the amount of cobalt oxide is from about 0.5 to 5.0% by weight of total metal and the amount of water-soluble chloride is from about 5 to 200% by weight of total metal;

the improvement which comprises conducting said reaction in the presence of a molybdenum compound selected from the group consisting of a molybdenum oxide or an inorganic molybdenum salt in an amount of from about 0.5 to 5% by weight based on the weight of the total metal.

2. The method of claim 1 wherein said molybdenum oxide is $MoO_3$.

3. The method of claim 1 wherein said molybdenate is $Na_2MoO_4$ or $(NH_4)_2 MoO_4$.